United States Patent [19]

Dobbins

[11] 4,155,315
[45] May 22, 1979

[54] MOBILE SPREADER

[76] Inventor: John B. Dobbins, 9442 Mayrene Dr., Garden Grove, Calif. 92641

[21] Appl. No.: 861,207

[22] Filed: Dec. 16, 1977

Related U.S. Application Data

[63] Continuation-in-part of Ser. No. 682,604, May 3, 1976, abandoned.

[51] Int. Cl.$^2$ .............................................. A01C 7/08
[52] U.S. Cl. ........................................ 111/8; 111/10; 111/75; 111/81; 172/90; 172/184; 172/200; 222/613
[58] Field of Search ............... 222/559, 560, 561, 199, 222/200, 191, 236, 238, 233, 414, 613; 239/683, 676; 111/8, 9, 10, 11, 12, 13, 36, 37, 42, 75, 76, 81, 85, 87; 172/72, 90, 112, 158, 184, 193, 194, 537, 548, 555, 556, 558, 248, 448, 439, 148, 149, 150, 151; 280/408, 410

[56] References Cited

U.S. PATENT DOCUMENTS

| | | | |
|---|---|---|---|
| 360,877 | 4/1887 | Harrell | 222/177 |
| 876,951 | 1/1908 | Dollison | 172/148 |
| 1,179,285 | 4/1916 | Crenshaw | 222/177 |
| 1,450,070 | 3/1923 | Fuller | 111/8 |
| 1,763,757 | 6/1930 | Charles | 222/619 |
| 2,324,499 | 7/1943 | Erb | 222/561 |
| 2,617,343 | 11/1952 | Warne | 172/451 X |
| 2,733,838 | 2/1956 | Neff | 111/10 X |
| 2,772,038 | 11/1956 | Morrissey | 222/176 |
| 3,062,300 | 11/1962 | Bullard | 172/184 X |
| 3,083,652 | 4/1963 | Brettrager et al. | 111/8 |
| 3,121,515 | 2/1964 | Johnson et al. | 222/414 |
| 3,140,677 | 7/1964 | Fraser | 111/8 |
| 3,352,261 | 11/1967 | Bonnell | 111/8 |
| 3,446,165 | 5/1969 | Magda et al. | 111/11 |
| 3,606,099 | 9/1971 | Benson | 222/414 |
| 3,815,527 | 6/1974 | Dobbins | 222/561 |

FOREIGN PATENT DOCUMENTS

| | | | |
|---|---|---|---|
| 5871 | 8/1903 | Denmark | 222/238 |
| 484026 | 10/1929 | Fed. Rep. of Germany | 291/34 |

Primary Examiner—Edgar S. Burr
Assistant Examiner—James R. Feyrer
Attorney, Agent, or Firm—Smyth, Pavitt, Siegemund, Jones & Martella

[57] ABSTRACT

A mobile spreader of the type drawn by a tractor includes a hopper mounted on a roller. The roller is provided with a jarring strip which imparts a jolt to the hopper on each revolution of the roller. This jolting action prevents bridging of the material in the hopper, knocking the hung-up material down into the lower portion of the hopper where an agitator and an impellor further stir up the material. The cooperative effect of the jarring strip, the agitator and the impellor is to provide a steady supply of material, even when moist material is being distributed. The rate of application of the material is controlled by a slidable apertured plate disposed across an opening in the bottom of the hopper. The spreader may be selectively provided with a rake, a floater plate, and a spiker. The spiker may be attached in front of the roller to open the turf to receive the material, or behind the roller to work the applied material into the turf. In addition, the spiker aerates the turf. The spreader is provided with a set of reverse pickup points as well as the normal pickup points to permit the spreader to be drawn in a backward or forward orientation, respectively, by a tractor. This permits the spreader to be used for applying an unusually wide variety of treatments to the turf.

14 Claims, 22 Drawing Figures

U.S. Patent May 22, 1979 Sheet 1 of 6 4,155,315
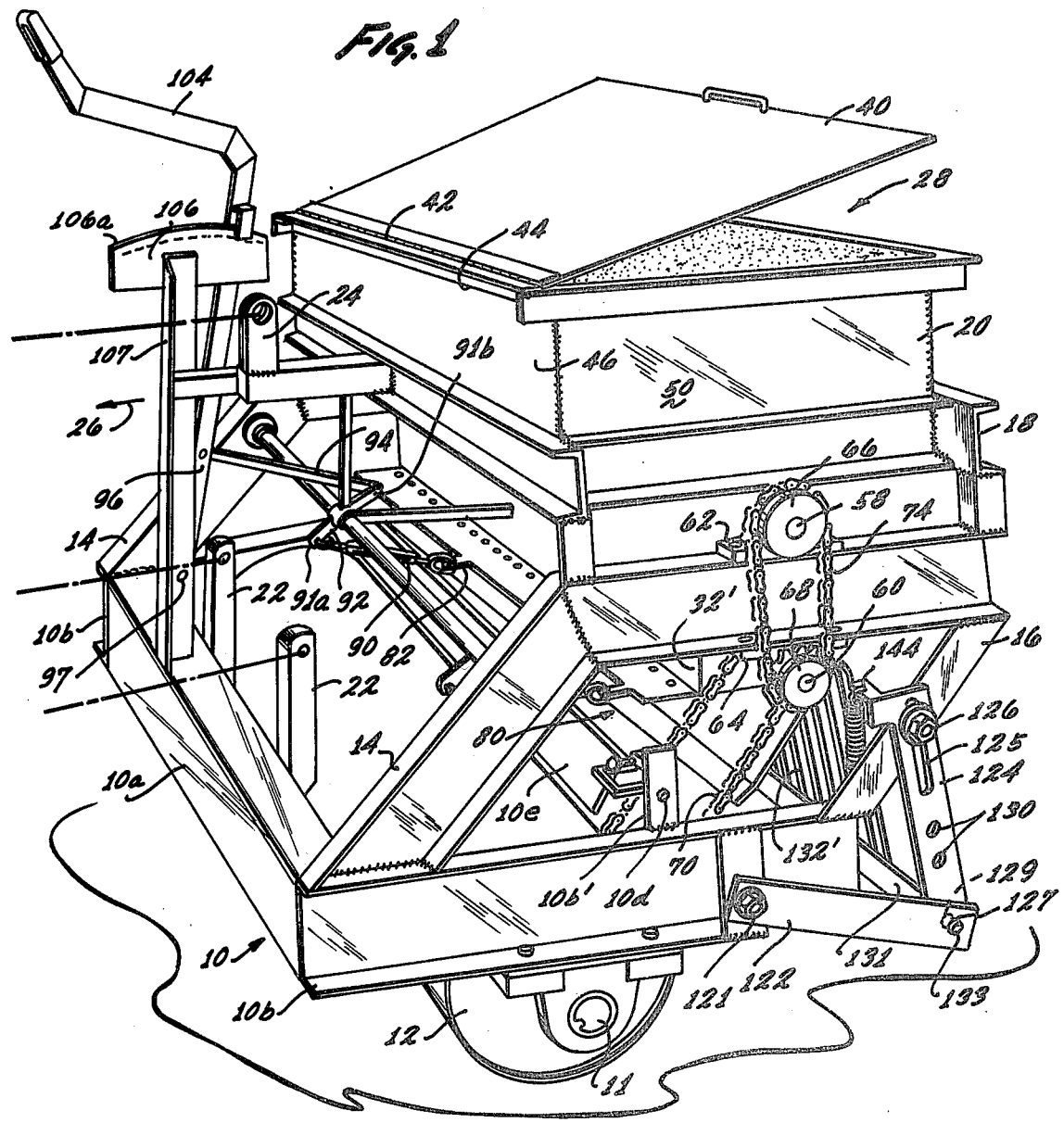
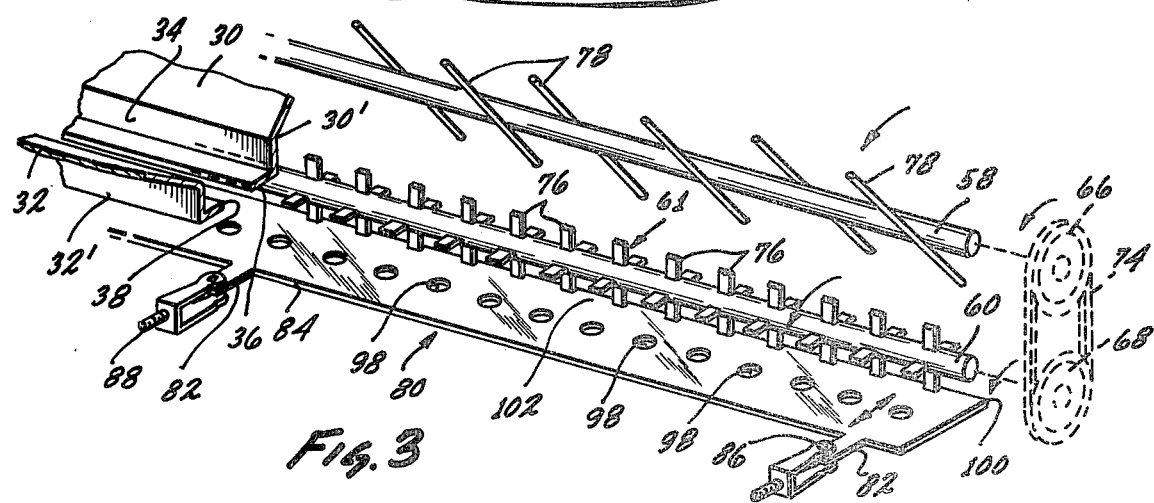

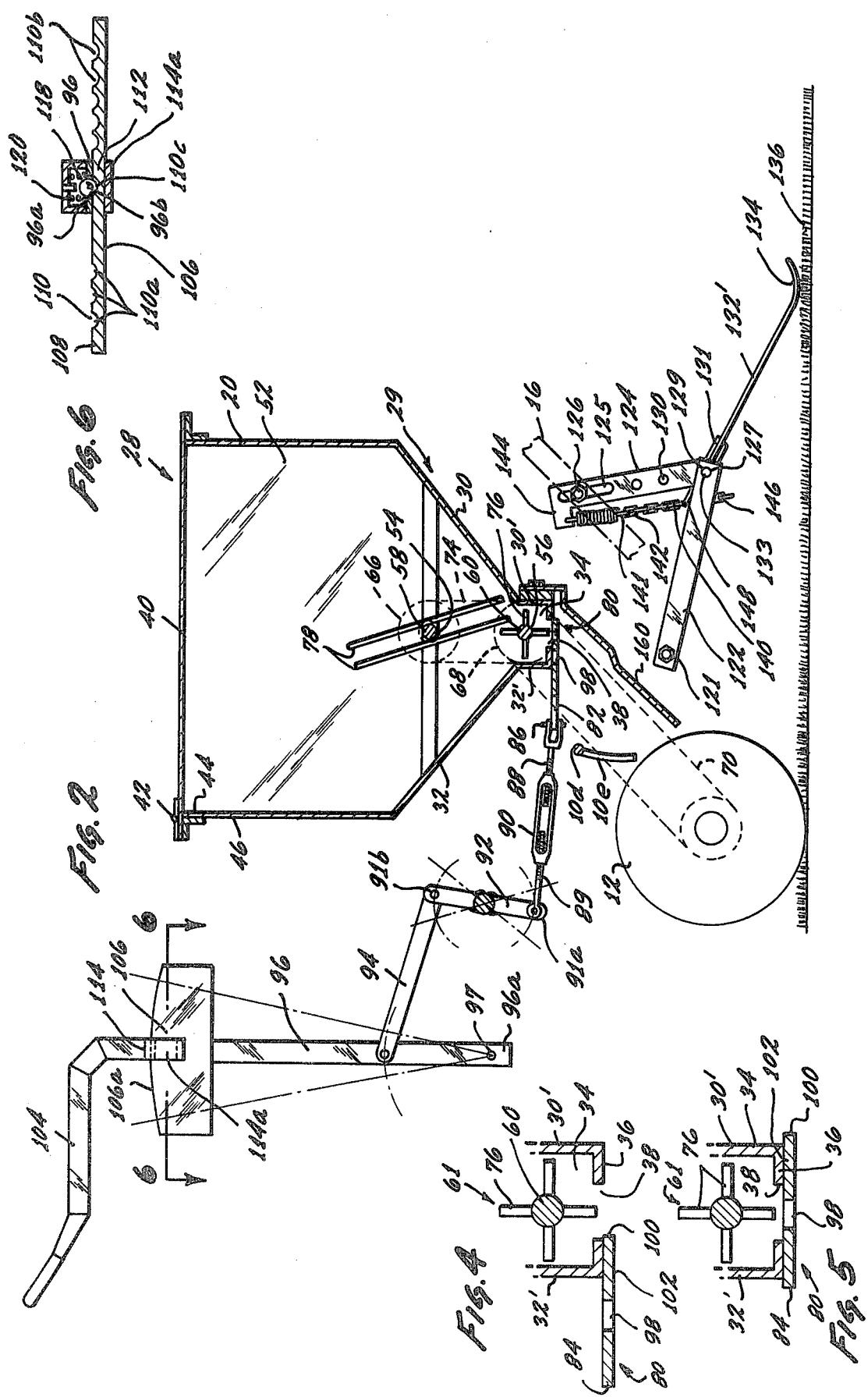

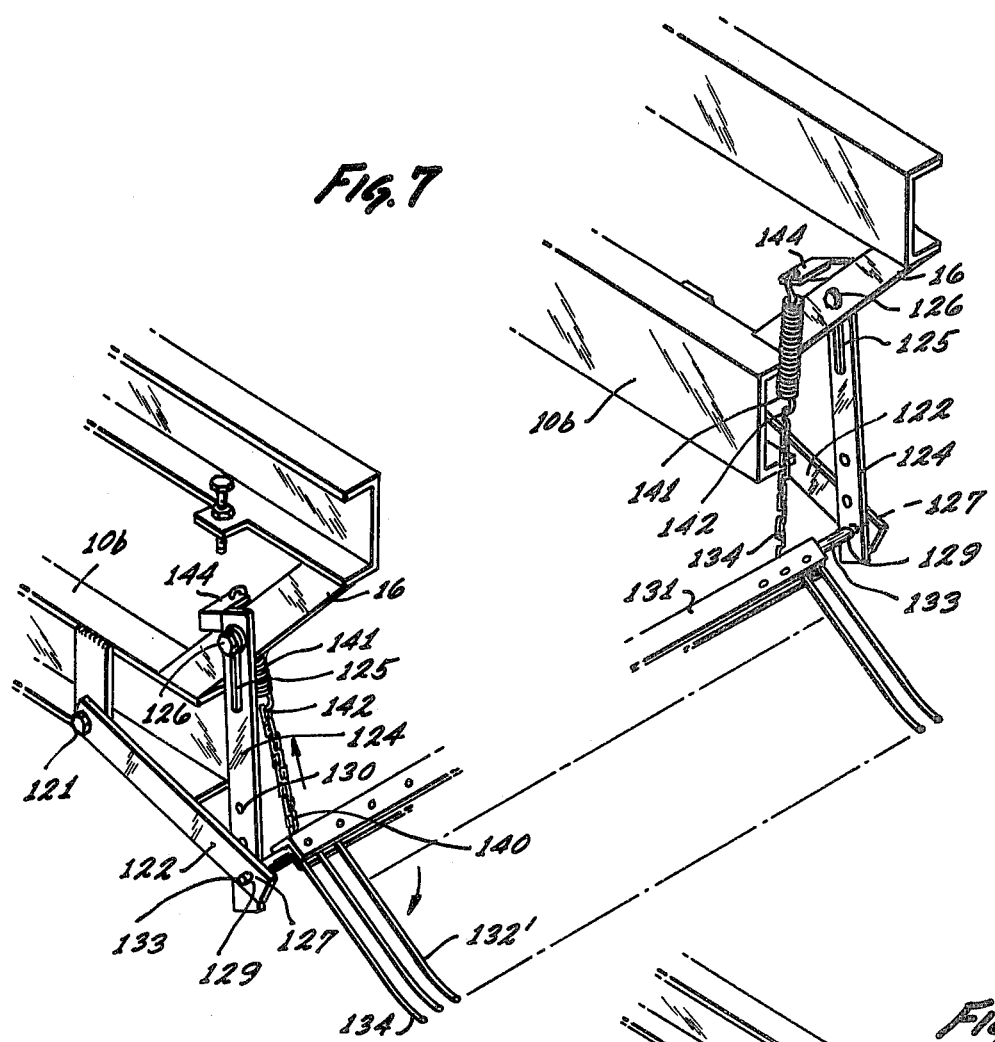
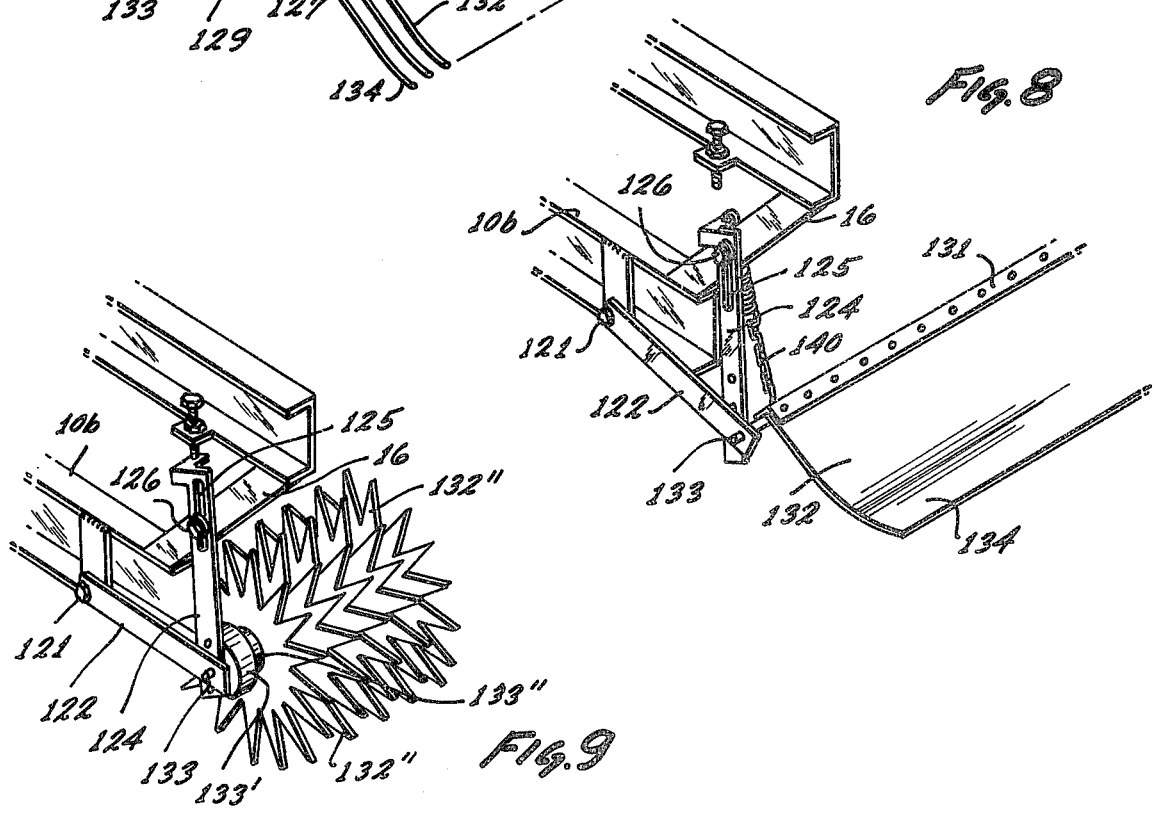

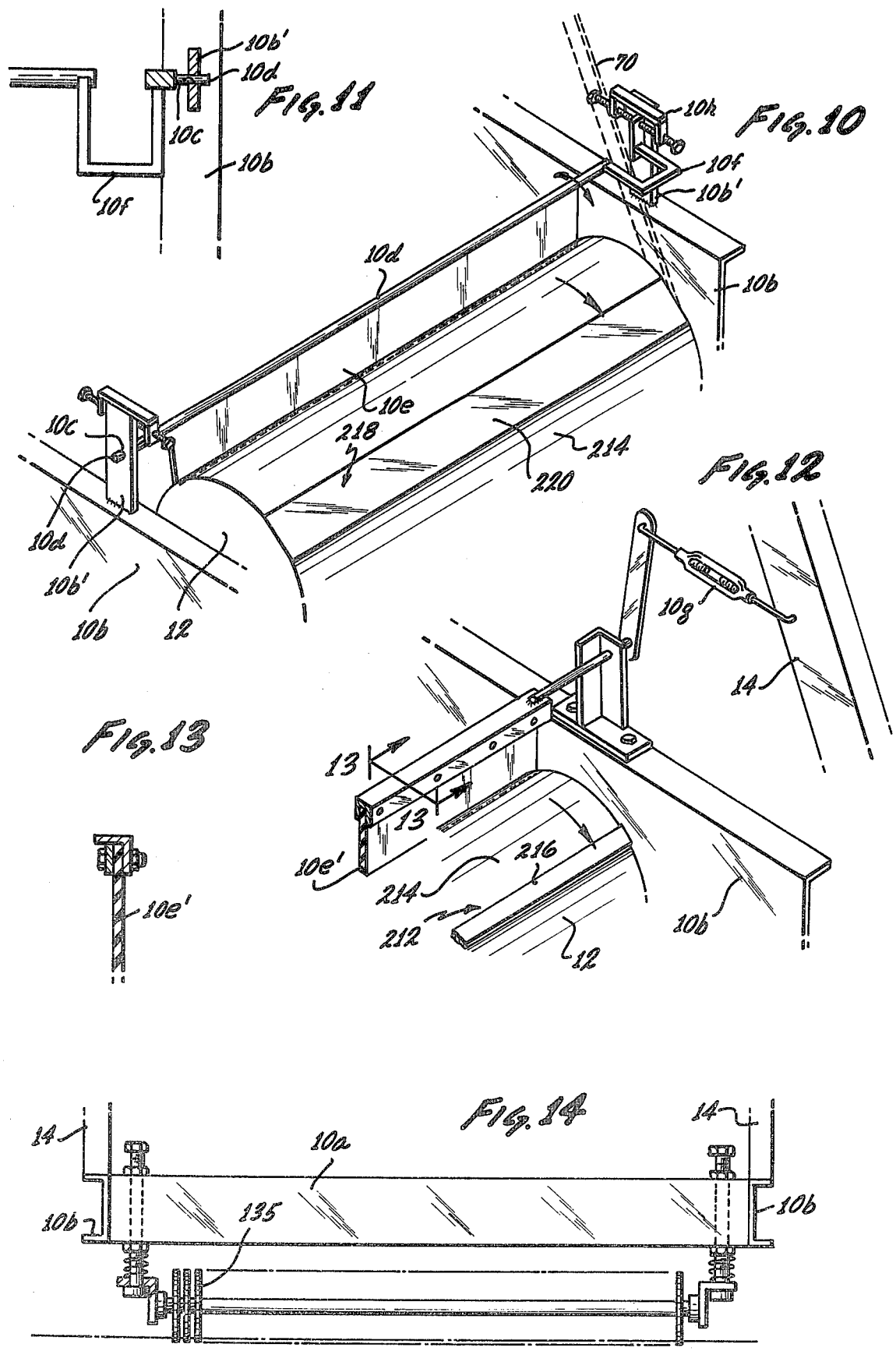

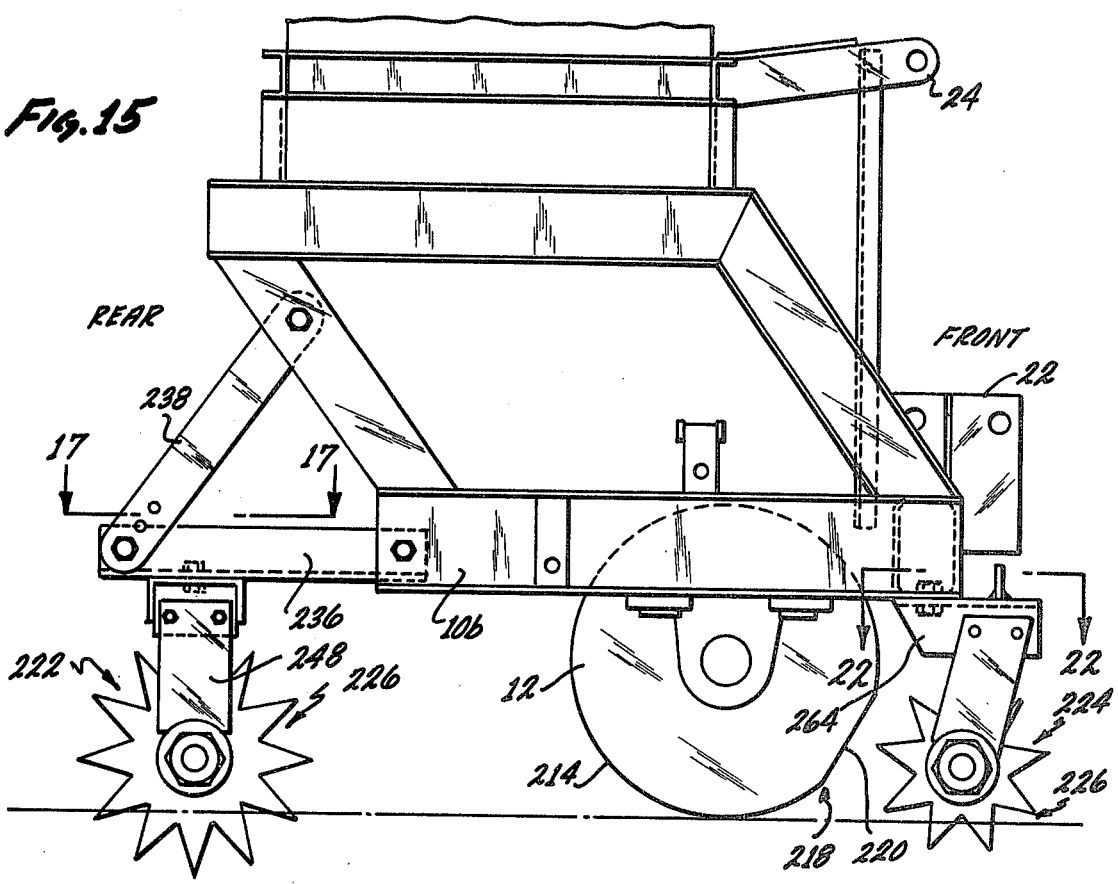
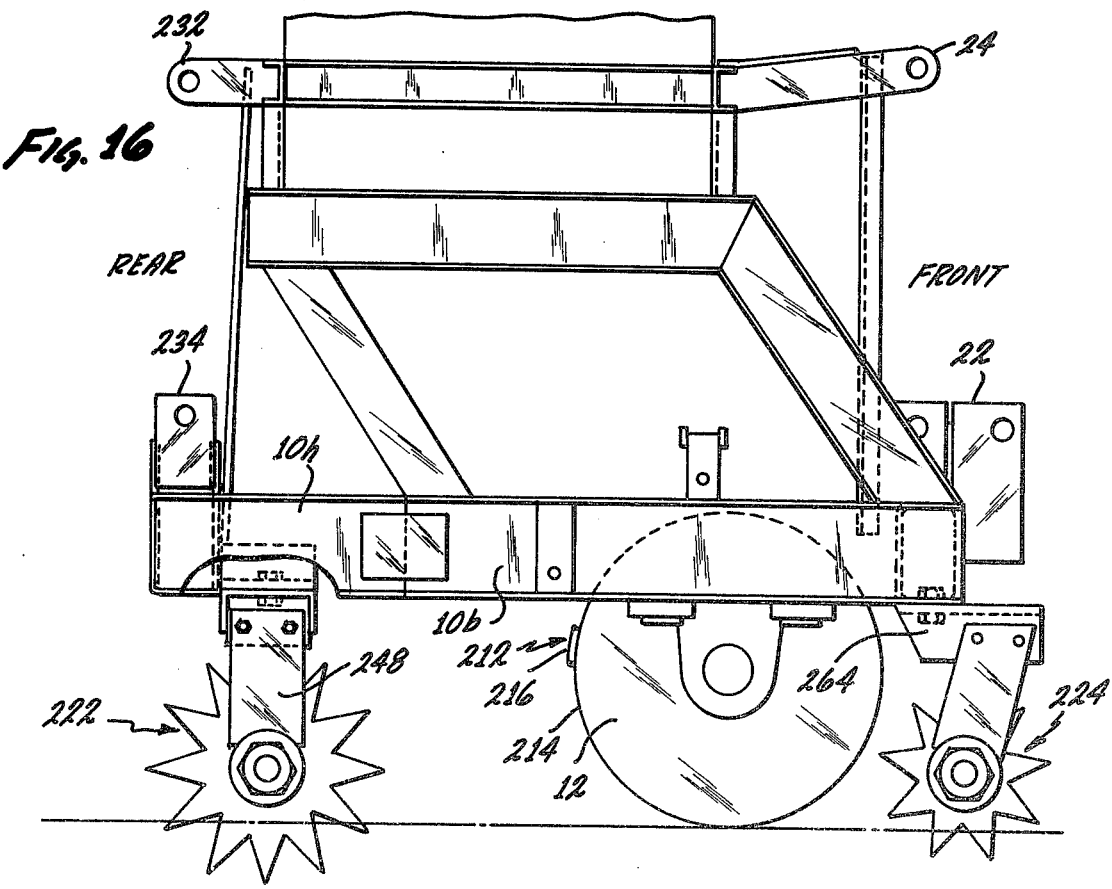

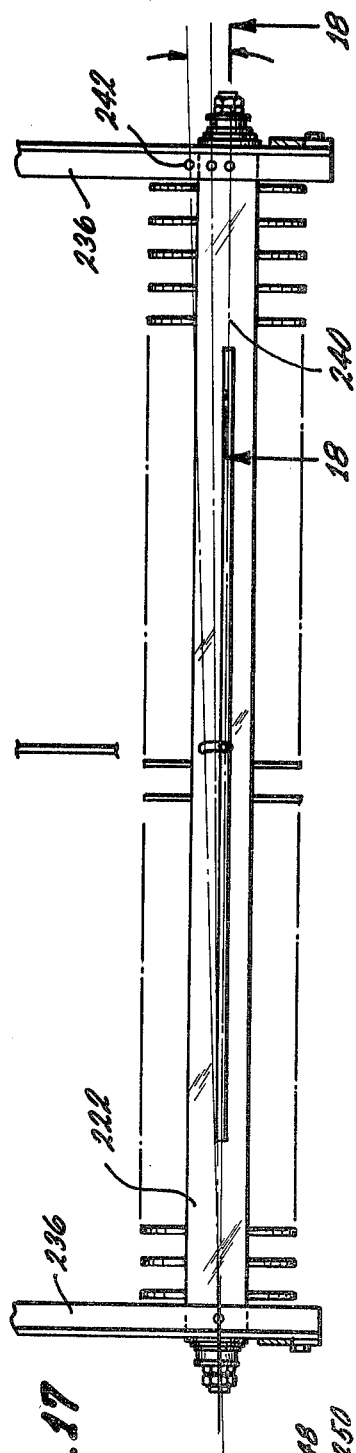
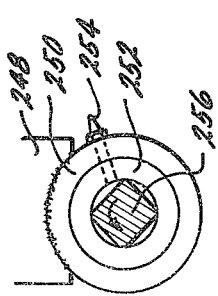
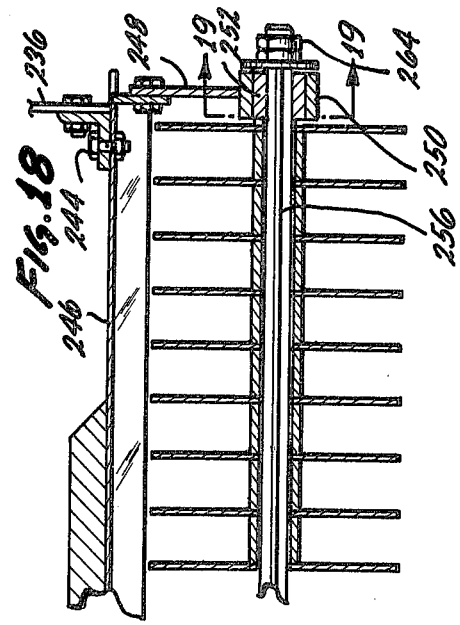
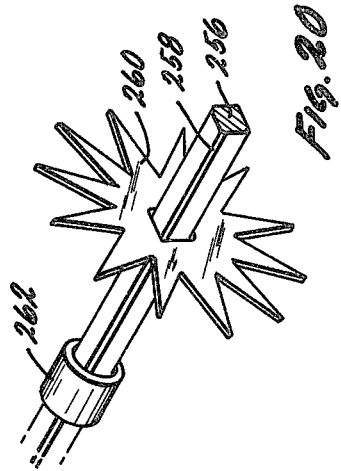
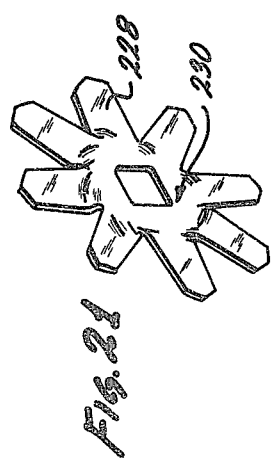
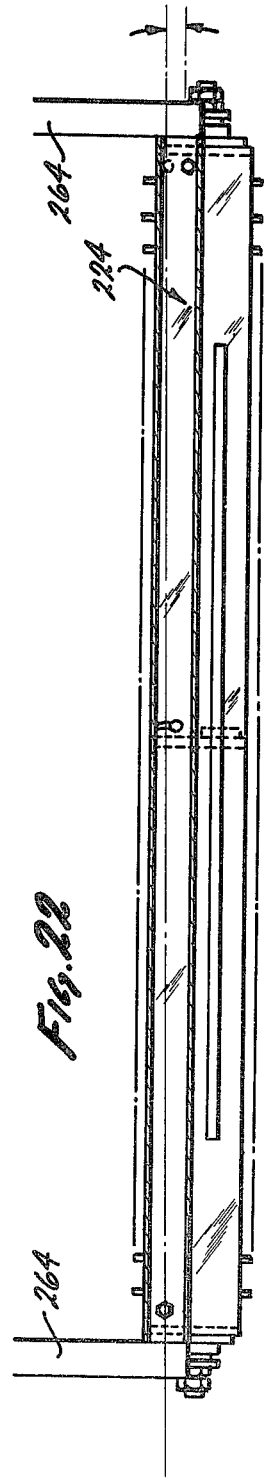

MOBILE SPREADER

IMPROVED MOBILE SPREADER

This application is a continuation-in-part of copending U.S. Pat. application Ser. No. 682,604 filed May 3, 1976 by John B. Dobbins, entitled "Mobile Spreader", now abandoned. The benefit of that filing date is claimed for the material disclosed therein.

BACKGROUND OF THE INVENTION

1. Field of the Invention

This invention relates to mobile apparatus for dispensing a wide variety of materials over turf or other ground surfaces and, particularly, to the type of such apparatus which is intended to be drawn by a powered tractor.

2. Description of the Prior Art

For more than a century, different types of apparatus intended to be drawn behind a horse or tractor have been devised for the purpose of planting seed and, in some cases, first cultivating the soil and, in other instances, rolling the ground after the seed has been sown.

While each of the many different types of apparatus known in the prior art may have accomplished the particular purpose for which such apparatus was devised, none of such prior art apparatus has been found suitable for performing a number of functions which it has been found desirable to have been performed by tractor-driven apparatus, particularly intended for the planting, cultivation and maintenance of a number of different types of turf or grass surfaces.

It is well recognized today that many sports and other outdoor activities are conducted on grass or turf surfaces as, for example, golf, football, soccer, lawn tennis and even horse racing. In addition, with population increases in major population centers, there has been much more emphasis on the part of municipalities in providing more grass-covered recreational areas, such as parks. All of such turf or grass surfaces, however, require a considerable effort in order to plant and maintain and in doing so, it is often found desirable to disperse over such surfaces a variety of different materials of quite different constituencies.

Initially, when an area is to be made ready for planting, it may first be desirable to spread thereover a material such as peat moss or compost. Additionally, the planter may desire to dispense over the area a certain type of fertilizer to be worked into the soil. Then, after the soil is made ready, grass or dichondra seed might be sown. Subsequently, after the grass is grown, it may become necessary from time to time to refertilize it, to spread more topsoil over the area, or, in some instances, to spread over the turf even sand or additional compost or peat moss.

While some types of prior art apparatus may be effective for cultivation of the soil, others, for planting or seed sowing, others, for rolling, and still others, for spreading some types of materials, no prior art apparatus, including that of my own prior U.S. Pat. No. 3,815,527, has been found to be capable of effectively handling the full range of materials which it may be desired to spread over an area to accomplish the precultivation of the soil, its fertilization, the sowing of seed, and subsequent maintenance of the resulting turf.

SUMMARY OF THE INVENTION

It will be readily appreciated by those persons involved in such operations that the flow characteristics of the various types of materials which may be thus required to be spread in order to plant, cultivate and maintain an acceptable turf or grass surface may vary quite widely. For example, dry, small-grained sand and dry grass seed may flow almost like a liquid. Consequently, when they are placed in a hopper, these materials ordinarily will pass quite easily through any small opening provided in the bottom of the hopper. On the other hand, materials such as compost, peat moss, and moist sand, do not easily flow through relatively small openings. Indeed, such materials may be required to be forced out of a hopper opening.

Where material in the hopper may tend to cake or otherwise stick to itself, it is necessary to provide in the hopper some type of impellor or agitator, such as is disclosed in my prior U.S. Pat. No. 3,815,527. Such an agitator functions, in part, to move the material which drops down into the bottom of the hopper, toward the dispensing slot or other opening and to pass the same therethrough. I have found, however, that even when a single rotated agitator or impellor is provided in the manner disclosed in my said prior patent, with certain types of material, such as a damp peat moss or topsoil, dampened grass seed, or wet sand, such material may tend to cake and bridge peripherally above the rotating paths of the impellor blades. As a result, at a certain point, the impellor blades may fail to sweep down such material so as to impel it toward the slotted opening at the bottom of the hopper. To prevent any such bridging build-ups of material, it is a feature of the present invention to provide in the hopper a second agitator. The shaft of this second agitator desirably should be spaced from, but parallel to, the shaft of the first agitator and provided with a plurality of elongated radiating elements the paths of which sweep between at least some of the blades or paddles radiating from the shaft of the first agitator. Thereby, when such second agitator is also rotated with the first agitator, the radiating elements will move into, cut through and break up any material build-ups, so that the material will then drop into the paths of the blades or paddles of the first agitator.

In Danish Pat. No. 5871, issued Aug. 17, 1903, to Lundh et al., there is shown an agitator-impellor combination which presumably is intended to overcome the tendency of moist materials in the hopper to form bridges over the regions swept by the impellor blades. However, because of the stiffness of the material to be spread, there is a limit to how large the agitator can be made while keeping the torque required to operate it at a reasonable value, particularly when the spreader is first moved after being loaded. Thus, although the addition of the agitator is beneficial in preventing the formation of small, tightly-packed bridges over the impellor, it cannot prevent larger bridges from forming above the agitator and elsewhere within the hopper when certain materials are used.

To overcome this problem of bridging above the agitator, there is provided in the present invention a jarring strip, removably attached to the roller and extending in an axial direction along the outer surface of the roller so that each time the jarring strip contacts the ground as the spreader advances, the hopper is jolted, first upwardly, then downwardly. This jolting has been found effective to prevent bridging about the agitator and elsewhere within the hopper. The height of the jarring strip above the cylindrical surface of the roller has been chosen to provide adequate but not excessive jolting without interfering excessively with the normal rolling action of the roller.

In an alternative embodiment, the roller is formed with a flat portion on its cylindrical surface to produce the jolting action.

The ability of the spreader to distribute relatively moist materials in a uniform manner is greatly enhanced by the jolting action produced by the jarring strip. The current trend is to top dress with sand, which is usually delivered to the site in a moist condition and therefore is difficult to spread evenly in most contemporary spreaders. In contrast, the spreader of the present invention can distribute the moist sand evenly without difficulty.

In addition, it has been found that where it is desirable to dispense only very small quantities of the material from the hopper such as, for example, expensive grass seed, it may be difficult to control properly the flow of such material by simply uncovering the slot at the bottom of the hopper by drawing back the edge of the covering slider plate. I have found it desirable, therefore, to provide an alternate set of passages through the slider plate in the form of a plurality of aligned orifices inwardly from the edge of the slider plate which defines one side of the solid area of the slider plate. In order to utilize both means of partially or completely uncovering the slotted opening an articulated control means including a pivotable lever with an articulated connection extending forwardly of the hopper to be reachable by the tractor driver is provided. With such pivoted lever, the slider plate may be either drawn forward into one of the several settable dispositions to expose the slotted opening partially or completely; or alternatively, the pivoted lever may be shifted backwardly to bring into register with the slotted opening to a selected extent, any or all of the orifices on the opposite side of the solid area of the slider plate. By this means, the material may be dispensed over a much wider range of material control flow rate than in any prior art devices. Consequently, as the apparatus is moved over one area, for example, where intensive seeding may be desired, the pivotable lever may be moved forward to uncover a substantial part of the slotted opening of the hopper. On the other hand, as the apparatus is moved over an area where only light seeding may be desired, the pivotable lever may be shifted in the opposite direction to move the slider plate back to expose only a predetermined number and/or portion of the orifices in the forward part of the slider plate.

It will thus be appreciated by those persons who are involved in cultivating, seeding, fertilizing and maintaining turf areas that the apparatus of the present invention is particularly useful in that the hopper may first be filled with one type of material for dispensation and then, as soon as the hopper is emptied of that material, it may then be refilled with a material of entirely different flow characteristics. All that the operator is required to do in order to adapt the apparatus to spread the material of such different flow characteristics, is to change the lever setting which determines the disposition of the orificed slider plate in reference to the slotted opening of the hopper.

As the material passes out of the bottom of the hopper it flows down over a deflector plate which conducts it to strike the lower portion of the roller. As the material thus strikes the roller, it is bounced or fluffed down onto the turf surface onto which the roller is moving. However, since the roller surface is moving upwardly as the material strikes it, should the roller become wet by passing over damp grass, it may be found that certain types of material may tend to adhere to the upwardly moving roller surface with the result that the dispensed material may pass over the top of the roller and then be either rolled onto the grass in irregular patterns or it may continue to stick to the roller surface and pick up additional material each time it passes the deflector plate. To prevent any such accumulation of material on the roller surface, it is also a feature of the present invention to provide a scraper parallel to the roller which may be moved into position closely adjacent the roller above the portion of the roller's surface which is truck by the material arriving via the deflector plate.

One currently-favored turf treatment calls for aerating the turf and subsequently applying top-dressing materials to it. The spreader of the present invention is unique in that it can deliver this treatment in a single pass over the turf, even when the sand to be distributed is moist.

Another currently-favored turf treatment is called overseeding, which is a turf maintenance treatment which extends the season by permitting the turf to be used earlier in the spring and later in the fall. A spiker attachment is used in the overseeding treatment, not so much to plow up the soil, as to raise and spread the grass and to open up the thatch so that the seed is placed deep in the grass or next to the soil for maximum germination. The seed is planted in a uniform coverage pattern instead of in rows. Prior art seeders for overseeding put the seed down in rows rather than in a uniform distribution, resulting in a less uniform growth. The use of the spiker attachment in the over-seeding treatment results in a significantly increased germination rate.

To produce this highly desirable sequence of opening the grass, dropping the seed, and rolling in a single pass over the area to be overseeded, the spreader is provided with an additional set of pick-up points, called reverse pick-up points, which permit the spreader to be attached to a tractor with the spiker ahead of the roller, which is the reverse of its normal manner of attachment. In this mode of operation, the spreader is oriented backwards as it is drawn behind the tractor, so that the spiker (which is mounted on the rear of the spreader) first passes over a given area, followed by the roller (which is located below the front of the spreader).

In an alternative embodiment, an optional additional spiker can be provided mounted to the spreader in front of the roller to pass over the given area after the roller (when the spreader is attached backwards to the tractor) to work the seeds more deeply into the soil or grass.

The spreader of the present invention includes an adjustment for selectively imparting a slight yaw to the spiker so that its axis can be canted slightly with respect to the axis of the roller. This causes each tine of the spiker to be pulled slightly sidewardly while in contact with the turf, producing a slight discing action, which has been found to be highly beneficial both for aerating the soil and for vigorously opening and spreading the turf during the overseeding.

In an alternative embodiment, this same discing action is enhanced by use of a different type of spiker both on the rear and front mounted attachments. In the alternative spiker front and rear attachment, the tines of the spiker are replaced by blades which are inclined to the plane in which they rotate.

Thus, it will be readily appreciated by those persons skilled in the art of turf dressing, that the apparatus of the present invention offers many advantages over available prior art apparatus.

The novel features which are believed to be characteristic of the invention, both as to organization and method of operation, together with further objects and advantages thereof, will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

In the accompanying drawings:

FIG. 1 is a perspective view of the apparatus of the present invention;

FIG. 2 is a schematic view of the principal features of the present invention;

FIG. 3 is a perspective view, partly cut away, of the bottom of the hopper, the slider plate, and the two agitators;

FIGS. 4 and 5 are enlarged partial sections of the bottom of the hopper, the first agitator and the slider plate showing two possible positions into which the slider plate may be shifted;

FIG. 6 is an enlarged section taken on the line 6—6 of FIG. 2 and looking in the direction of the arrows;

FIG. 7 is a perspective view of the after end of the machine showing the means for carrying a ground processing element such as a rake, arcuate plate or series of star wheels;

FIG. 8 is a portion of a view similiar to FIG. 7, showing an arcuate plate substituted for the rake in FIG. 7;

FIG. 9 is a view similar to FIG. 8, but showing a portion of the star wheel digger substituted for the rake in FIG. 7;

FIG. 10 is a partial perspective view looking rearwardly from just inside the corner of the machine appearing in the left center of FIG. 1;

FIG. 11 is a plan view of the U-shaped bridge member shown on the right hand side of FIG. 10;

FIG. 12 is a partial view similar to what is seen in the right side of FIG. 10, but in which there has been substituted a plastic scraper blade for the metal blade shown in FIG. 10;

FIG. 13 is the section taken on the line 13—13 of FIG. 12 and looking in the direction of the arrows;

FIG. 14 is a view of a star wheeled digger which may be provided in a further embodiment of the invention under the forward frame member shown in the left hand lower side of FIG. 1;

FIG. 15 is a side elevation view of a preferred embodiment of the mobile spreader;

FIG. 16 is a side elevation view of an alternative embodiment of the mobile spreader;

FIG. 17 is a top view in the direction 17—17 indicated in FIG. 15 showing the spiker in a preferred embodiment mounted to the spreader rearward of the roller;

FIG. 18 is a cross-sectional view in elevation through the axis of the spiker in a preferred embodiment;

FIG. 19 is a cross-section view in the direction 19—19 indicated in FIG. 18 and showing the hub by which the spiker is mounted;

FIG. 20 is a perspective view showing an alternative embodiment of a spiker blade; and FIG. 22 is a top view in the direction 22—22 indicated in FIG. 15 and showing the manner in which a second spiker is mounted to the spreader in front of the roller.

DESCRIPTION OF THE PREFERRED EMBODIMENT

Referring to FIGS. 1 and 2 of the drawings, the improvements which constitute the present invention are incorporated in a mobile spreader which may comprise a rectangular frame 10 formed of end members 10a and side members 10b, mounted on the axle 11 of a roller 12 and supporting, through pairs of rearwardly extending angular members 14 and 16, upper rectangular framing 18 within which is disposed a hopper 20. Upwardly extending yoke elements 22 and a further element 24 may be provided for attaching the spreader to a tractor adapted to pull the spreader in the direction of the arrow 26.

As best seen in FIG. 2, the hopper may comprise an upper rectangular box-like container portion 28 and a lower portion 29 having downwardly converging walls 30 and 32. The lower edges 30' and 32' of the walls 30 and 32, respectively, terminate in a rectangular channel section 34, the bottom wall 36 of which may be slotted at 38 to provide an outlet for material contained in the hopper. The top of the hopper, desirably, may be provided with a lid 40 hinged at 42 along the upper edge 44 of one of the end walls 46 of the container portion 28 of the hopper. The side walls 50, 52 closing the sides of the lower portion 29 and the channel section 34 of the hopper 20, may be orificed at 54 and 56 to permit rotatable shafts 58 and 60, respectively, to be passed through said walls 50,52.

The extremities of said shafts 58 and 60 may extend outside of the walls 50 and 52 to be journalled for rotation in the bearings 62 and 64, respectively, and may further carry sprockets 66 and 68, respectively. A further sprocket (not shown) may also be provided on the shaft 60 inwardly of the sprocket 68 whereby a chain 70 may be provided to pass over another sprocket (not shown) on the roller shaft 11 inwardly of the bearing 62 to drive the shaft 60 of the impellor 61 when the spreader is pulled forward to rotate the roller 12 and its shaft 11. A second chain 74 is passed over and around both sprockets 66 and 68. The shaft 60 within the side walls 50 and 52, defining the lower portion 30 of the hopper 20, may be provided with a plurality of short radiating paddles or blades 76, as best seen in FIG. 3, while the shaft 58 of the agitator may be provided with a plurality of elongated elements 78 which may be welded or otherwise secured tangentially to the shaft 58. Desirably, each element 78 may be secured to the shaft 58 mid-section of the element 78 with each element 78 being disposed parallel to the other elements 78, but alternating on the diametrically opposite sides of the shaft 58.

Transversely and slidably disposed below the rectangular slotting 38 in the bottom wall 36 of the channel section 34 of the hopper 28 and in close abutment with the underside of the wall 36, is slider plate 80. The slider plate 80, desirably, is rectangular in shape with three tabs 82 extending forwardly from the leading edge 84 of the plate 80. Each of these tabs 82 are orificed (not shown) to enable a pin 86 to be passed through the orifice whereby the tab 82 may be coupled by an element 88 of a turnbuckle 90 and a second element 89 to one end 91a of a pivoting lever 92. The other end 91b of said lever may be linked by a member 94 to a vertical stick control element 96, the lower end 96a of which may be pivotably secured on the base frame member 10a at 97.

Inwardly of the leading edge 84 of the slider plate 80, there is provided a row of orifices 98. Between this row of orifices 98 and the trailing edge 100 of the slider plate, is a solid rectangular area 102 having a dimension between the orifices 98 and the trailing edge 100 which is at least as great as the width of the slotting 38.

As may be seen from FIGS. 1, 2 and 6, the vertical control stick 96 is provided at its upper extremity with a handle 104. In order to enable the control stick 96 to be disposed in a plurality of settable positions from which it may be moved by the operator, the control stick may pass closely adjacent a plate 106 secured to a vertical member 107 extending upwardly from frame member 10a and supported with reference to the frame 18. One side 108 of the plate 106 may be provided with a series of vertically extending indentations or detents 110, some 110a of which may be located on one side of the mid-point 112 of the plate 106 and others 110b of which indentations 110 may be disposed on the opposite side of the mid-point 112 of the plate 106. One indentation 110c may also be provided at the mid-point 112 or at any other spot intermediate the two sets of indentations 110a, 110b. On one side of the stick control element 96 an overhung projection 114 may be secured near the upper extremity of the stick 96, with the overhung portion 114a extending downwardly over the top edge 106a of the plate 106. The control element itself may comprise a tube of a rectangular cross-section. A side 96a of the tube element 96 may be slotted or at least orificed in an area 96b where the overhung projection 114 is secured to such side 96a to enable a ball or cylinder 118 to be pressed through such slot by a spring 120.

A short vertical support element 10b' is welded centrally to each side frame member 10b and may be orificed at 10c. Shaft 10d, which extends through the orifice 10c in each of the two vertical support elements 10b' and is rotatable in said orifices 10c, carries an arcuate scraper blade 10e which may be either lifted clear of the surface of the roller 12, or may be brought close to such surface for the purpose hereinafter to be explained. Because of the course followed by the chain 70, it may be necessary to provide a U-shaped element 10f toward the one end of the shaft 10d. In the embodiment of the invention shown in FIG. 10, the scraper blade 10e may be of metal or of a very rigid plastic material. In the alternative embodiment illustrated in FIGS. 12 and 13, however, the scraper blade 10e' may be formed of a more flexible material such as rubber, and moreover, in this embodiment may have its position relative to the roller 12 adjusted by a turnbuckle 10g instead of by the screw type means 10h shown in FIG. 10.

Toward the rear of each side frame member 10b may be pivotably attached by a bolt 121 a rearwardly projecting brace 122. Also, a second downwardly directed brace 124 having a slot 125 may be slidably attached at one end to the rear frame member 16 by another bolt 126. Each of the braces 122 and 124 is orificed at its end which is unattached to a frame member 122 being numbered 127, and the orifice in the end of member 124, numbered 129. However, brace member 124 may have additional orifices 130 disposed inwardly from the end having orifice 129. A transversely extending pair of clamping plates 131, from each end of which extends a trunnion 133, may serve to clamp between them either an arcuate plate 132 or rake 132'. When each trunnion 133 is passed through both the orifice 129 in brace member 124 and the orifice 127 in brace member 122 to protrude from the latter orifice in the manner shown in the lower right-hand corner of FIG. 1, the two brace members will be pivotably secured at their thus orificed ends, and the two clamping plates may grip between them either the arcuate plate 132 or rake 132'. Such plate 132 or rake 132' will be found to be floatingly carried astern of the machine by the brace members 122 and 124 in any of several dispositions ranging from complete elevation above the turf 136 or other ground surface over which the machine is being pulled or otherwise carried by a tractor, to a disposition in which the arcuate portion 134 of the plate 132 or the rake 132' is being closely pressed onto the turf 136, as shown in the lower right-hand corner of FIG. 2. For such range of dispositions to be provided for in part, a chain 140 may have one of its ends 142 attached to one end of the spring 141, with the other end of the spring being secured to a laterally projecting tab 144 on the upper extremity of the brace member 124. The other end 146 of the chain 140 may be securable along any of its links to the edge 148 of the pair of clamping plates 131. It may be seen that as the length of the chain 140 between its extremity 142 and its point of attachment at 148 to the clamping plates 131 is shortened, the latter and plate 132 or rake 132' will be pivoted about the axis of the trunnions 133 to press the arcuate portion 134 of the plate 132 down against the turf 136.

In operation, the operator first utilizes the handle 104 to set the control stick element 96 at the detent 110c intermediate the two groups of detents 110a, 110b. In this position, the solid area 102 of the slider plate 80 is disposed in the manner shown in FIG. 2 completely to cover the slotting 38 in the wall 36 of the lower channel portion 30' of the hopper 28. The lid 40 of the hopper may be raised and the hopper 28 filled with any type of material which it is desired to have spread over the turf 136. Depending upon the nature of the material and, particularly, its flow characteristics and the quantity of such material which it is desired to have spread on the turf 136, the operator moves the handle 104 either forward or backward, first pushing against the spring 120 so that the ball 118 may be redisposed in one of the detents 110a or 110b on the left-hand side or on the right-hand side, respectively, of the plate 106 as seen in FIG. 6. If the operator pulls the handle 104 toward the rear of the apparatus, this will cause member 92 to pivot about the shaft 93, and thereby pull the turnbuckle linkage 90 and the slider plate 80 forward to one of its several possible dispositions.

In its full forward position, the trailing edge 102 of the slider plate 80 will be moved completely across the slotting 38 as is almost shown in FIG. 4, thereby permitting material in the hopper 28 to flow down and out of the lower channel portion 34 of the hopper 28 through the slot 38 to strike the deflector plate 160 over which it flows until it hits the rotating roller 12, hence to fall onto the turf 136. The flow of the material through the slotting 38 is actually impelled by the blades 76 of the impellor.

If, because of the nature or composition of the material which is placed in the hopper, the material has any tendency to stick or otherwise not flow freely down through the lower portion 29 of the hopper 28, and particularly through the channel portion 34 for impulsion by the impellor 61, the rotation of the agitator shaft 58 with its elongated elements 78 will effectively reach up into the central area of the hopper 28 to break up rear-adhering portions of the material to cause it to flow down to and through the lower portion 29 of the hopper 28.

One of the noteworthy features of the present invention is the provision of a jarring means on the roller 12 to provide a jolt to the hopper upon each revolution of the roller to prevent the information of bridges within the material in the hopper, especially the material above the area swept by the elements 78 of the agitator.

In a preferred embodiment, shown in FIGS. 12 and 16, the jarring means is a jarring strip 212 attached to the ground contacting surface 214 of the roller 12 and extending radially a sufficient distance beyond the ground contacting surface 214 of the roller to impart a substantial jolt to the hopper as the mobile spreader advances on the roller 12. The jarring strip 212 includes a jarring strip ground contacting surface 216 which is elevated above the ground contacting surface 214 of the roller.

In FIGS. 10 and 15 there is shown an alternative embodiment of the jarring means in which the jarring strip 212 has been replaced by a flat spot 218 on the roller 12. The flat spot 218 includes a ground contacting surface 220 which is located radially nearer the roller axis than is the remainder of the ground contacting surface 214 of the roller.

In a preferred embodiment, the jarring strip 212 is a length of belting material which is bonded to the ground contacting surface 214 of the roller. In the alternative embodiment wherein the jarring means is the flat spot 218, it is formed by deforming the ground contacting surface 214 of the roller.

The jarring means, whether it be the jarring strip 212 or the flat spot 218 cooperates with the impellor and the agitator described above to produce a continuous uniform flow of material from the hopper. This is particularly important when the material to be applied is moist, because moist material has a greater cohesiveness which tends to encourage the formation of bridges of the material within the hopper above the region swept by the rotating elements 78 of the agitator. It has been found that the jarring means is highly effective in disrupting the bridges so that the bridging material falls into the area swept by the elements 78 of the agitator to be broken up. The impellor and agitator in turn cooperate with the deflector 160 to produce a uniform distribution of the material being applied to the turf. The jarring means, agitator and impellor assure that a steady flow of material leaves the bottom of the hopper, and the uniformity of the distribution of material on the turf is assured by the dispersing action of the deflector 160, which in cooperation with the roller 12 scatters the material being applied into a uniform random distribution.

The apparatus of the present invention may also effectively dispense material which is quite free-flowing as, for example, dry grass seed or dry small-grained sand. When such material is to be dispensed after it is placed in the hopper 28, the operator normally would not want to open the slotting 38 fully in the manner illustrated in FIG. 4. Otherwise, the material might flow out through the slotting 38 too rapidly. Thus, where such free-flowing material is to be dispensed, the operator may have a choice of either moving the slider plate 80 only slightly forward to expose only a small portion of the slotting 38 and the trailing edge 102 of the slider plate; or, the operator may move the handle and control stick forward, thereby to move the slider plate 80 rearwardly to place all or some part of the orifices 98 in register with the slotting 38. The operator thus has an effective wide-range control over the rate and amount of material which may be dispensed and thus spread by the apparatus.

In the event the surface of the roller 12 becomes moistened so that any of the material being dispensed through the bottom slot 38 of the hopper 28 and reaching the roller via the deflector plate 160, should begin to adhere to the surface of the roller 12 and thereupon commence an undesirable build-up of such material on the roller surface, the operator simply lowers the arcuate scraper blade 10e into a position wherein such blade is close to the outer surface of the roller. Thereupon, with further movement of the machine, the scraper blade 10e scrapes off the surface of the roller 12 any material which may be sticking to the roller surface and causes such scraped-off material to drop behind the roller 12 and onto the turf 136.

After the material has been thus dispensed to drop behing the roller, it may sometimes be desirable to cause the dispensed material to be pressed or otherwise worked into the turf or ground surface. Such pressing or working may be accomplished by lowering the floater plate 132 of FIG. 8 to where the arcuate portion 134 of the plate 132 is placed in contact with the turf and, as hereinabove explained, adjustment of the length of the chain 140 will result in this arcuate portion 134 being either lightly or firmly pressed against the turf.

It will bear pointing out that, as the machine is carried or otherwise drawn forward by the tractor, when the floater plate 132 or the rake 132' is lowered for contact with the turf 136, should the plate 132 or the rake 132' pass over a rock or bump in the turf surface, the two brace members 122, 124, the clamping plates 131 and the plate 132 or rake 132' will actually rise up over the rock or bump since the brace member 134 is slidably mounted to the frame member 16 by means of the bolt 126 and the slotting 125.

In addition, should the operator find it desirable to stop the tractor and back up the machine to cover any area where material may have been insufficiently spread, as the backing up occurs, the plate 132 or rake 132' will be forced to pivot clockwise about the axis of the trunnions 133. However, since the latter will be forced upwardly by the page or rake as it is pivoted under and about the axis of the trunnions 133, such upward force may be accommodated by the trunnions rising almost vertically for a distance equal to the length of the slot 125. Thereby, no damage may occur to either the plate 132 or the rake 132' because of such backing up action.

As may be seen in FIG. 9, an alternative ground processing element, known as a spiker, comprising a coaxial series of star wheels 132" may be substituted for the floater plate 132 of FIG. 8 or the rake 132' of FIG. 7. Desirably in effecting such a substitution, a bearing 133' is provided near the end of the shaft 133 within which bearing 133' and a sleeve 133" carrying the star wheels 132" may rotate. When the spiker is utilized it will be appreciated that after the material is spread by the machine, a certain amount of the material will find its way into the holes in ground which will be dug by the serrations of the star wheels 132" as they are rotated in contact with the ground. In the embodiment illustrated in FIGS. 14–16, a spiker assembly is disposed forward of the roller 12.

FIG. 15 shows a spiker 222 mounted, in a preferred embodiment, to the frame of the spreader rearward of the roller 12. FIGS. 15 and 16 also show a second spiker 224 mounted to the frame of the spreader in front of the roller 12. Each of the spikers includes a plurality of blades which extend radially from the axis of the spiker so that the tips 226 of the blades lie substantially on the surface of an imaginary cylinder coaxial with the spiker. FIG. 21 shows an alternative form of spiker blade in which the arms 228 are arched out of the plane of the spiker blade 230.

The spikers used in the present invention perform important functions. The spiker which passes over the turf ahead of the roller serves to open up the turf to receive the material being applied as well as to aerate the turf. The spiker which follows the roller serves to work the applied material deeper into the turf as well as to aerate the turf.

The major distinction between the embodiments shown in FIGS. 15 and 16 is that the embodiment of FIG. 16 includes the reverse mounting points 232, 234 which permits the embodiment of FIG. 15 to be attached to the tractor in either a forward orientation or through the mounting points 22, 24 or in a backward orientation through the mounting points 232, 234. In the embodiment of Figure the spiker 222 is mounted to the mobile spreader by arms 236 which extend rearward from the frame 10b of the spreader, and which are held in place by the arms 238. In order to provide for the reverse mounting points 232, 234, the method of mounting the spiker 222 in the embodiment shown in FIG. 16 is somewhat modified from that used in the embodiment of FIG. 15. In the embodiment of FIG. 16, the frame 10b is extended by the addition of an extension 10h which is sufficiently strong to withstand the forces exerted on the spreader by the tractor.

The advantages described above which can be obtained respectively with the spiker passing over the turf ahead of the roller and with the spiker following the roller, can be obtained through the embodiment of FIG. 16 using only a single spiker, normally the spiker 222 which is mounted rearward of the roller 12. In the embodiment shown in FIG. 16, if it is desired that the spiker 222 pass over the turf behind the roller 12, the spreader is attached to the tractor by the mounting points 22, 24. On the other hand, if it is desired that the spiker 222 should pass over the turf ahead of the roller 12, the spreader is attached to the tractor through the use of the reverse mounting points 232, 234. In the embodiment shown in FIG. 16, the use of the second spiker 224 is optional, although its use is beneficial for certain operations.

FIG. 17 is a top view of the spiker 222 of FIG. 15 in the direction 17—17 indicated in FIG. 15. FIG. 17 shows the manner in which the spiker 222 can be canted so that its axis 240 is canted with respect to the axis of the roller 12. This is accomplished by the provision in the arm 236 of a sequence of mounting holes 242 through which a bolt 244 of FIG. 18 is selectively passed to connect the spiker structure to the frame. The spiker structure includes a laterally extending mounting plate 246 of FIG. 18 to which vertically extending brackets 248 are attached at each end. As best shown in FIGS. 18 and 19, each of the vertically extending brackets 248 is welded to a hub 250 within which there is provided a bushing 252 in the form of a hollow cylinder. The hub 250 is provided with several grease fittings 254 which supply a generous quantity of lubricant to the interior of the bushing 252 within which the spiker axle 256 rotates.

As better seen in FIG. 20, the axle 256 of the spiker has a generally square cross section with the edges 258 bevelled. The spiker is formed by sliding onto the spiker axle 256 alternately spiker blades 260 and tubular spacers 262. The assembly of tubular spacers and spiker blades is then securely held by the nut 264 shown in FIG. 18.

FIG. 22 is a top view of the second spiker 224 showing the manner in which it is mounted in front of the roller 12. In one embodiment, the second spiker 224 is adjustably mounted to the brackets 264, also shown in FIGS. 15 and 16, so that the second spiker 224 can also be given a cant with respect to the axis of the roller, similar to the technique shown in FIG. 17 for canting the spiker 222.

The purpose of canting either of the spikers 222, 224 is to impart to their blades a slight inclination with respect to the direction in which the spreader is travelling so that the spiker blades will exert a selectively adjustable degree of plowing action to the turf when that is desired. To some extent the same type of plowing action can be obtained by the use of the alternative spiker blade 230 shown in FIG. 21. A canted spiker can also be used in dethatching operations.

According to the present invention, either of the spikers 222, 224 can be replaced by some other ground-processing apparatus such as a rake 132' as indicated in FIG. 7 or a floater plate 132 as shown in FIG. 8 above.

It should be readily appreciated by those persons skilled in the art and particularly those who have been concerned with the effective cultivation, seeding, fertilization and maintenance of large grass or turf areas, that the apparatus of the present invention offers many advantages over prior art apparatus heretofore available. Such advantages include the ability of the apparatus to accept and dispense practically any kind of material which is normally spread over turf or grass areas and to enable the operator to dispense such material in fairly precise amounts. In addition, the apparatus may be utilized to handle two completely different types of material, one immediately after the other, with a minimum of adjustment of the apparatus by the operator. In addition, after the material is dispensed, effective floating or working of the material into the turf may be readily accomplished.

The foregoing detailed description is illustrative of one embodiment of the invention, and it is to be understood that additional embodiments thereof will be obvious to those skilled in the art. The embodiments described therein together with those additional embodiments are considered to be within the scope of the invention.

What is claimed is:

1. In a mobile spreader pulled by a tractor and controlled by an operator, having a rigid frame supported on at least one roller having a generally cylindrical ground-contacting surface having a hopper carried by said frame, said hopper having converging walls defining a cavity to receive material to be spread, and having a rectangular bottom outlet disposed in a generally horizontal plane and elongated in a direction generally transverse the direction of motion of the mobile spreader, the combination comprising:

(a) jarring means associated with the ground-contacting surface of the roller for rotation with it and including a jarring means ground-contacting surface located at a radial distance from the roller axis sufficiently different from that of the generally cylindrical surface of the roller as to impart a jolt to the hopper, as the jarring means ground-contacting surface contacts the ground, of sufficient force to prevent the formation of bridges of said material within the hopper when moist material is being spread;

(b) a rotatable impellor, said impellor comprising a first shaft extending through said hopper closely above and parallel to the elongated direction of said outlet, said impellor including a plurality of blades spaced from each other along the length of said first shaft, and extending radially outwardly from said first shaft, each of said blades being of such limited length as to avoid contact with any part of the hopper, said first shaft being connected to the roller for rotation by said roller; and, (c) a rotatable agitator comprising a second shaft extending through the hopper parallel to the first shaft and spaced a substantial distance thereabove, said second shaft being connected to said first shaft for rotation with said first shaft in the same direction, said second shaft having a plurality of elements spaced from each other along the length of said second shaft and extending perpendicularly to said second shaft, said elements being thinner and longer than the blades on the first shaft, and of such length and spacing as, when the agitator is rotated, to sweep between pairs of radiating blades of the first shaft, thereby to break up any build-up of material which may occur in the hopper or bridging of said material about the area of the hopper swept by the blades of the rotatable impellor, said jarring means cooperating with said rotatable agitator to shake the material to be spread into the region swept by the elements of said rotatable agitator.

2. The combination of claim 1 wherein said jarring means further comprises a jarring strip attached to the ground-contacting surface of the roller and extending in the axial direction of the roller.

3. The combination of claim 1 wherein said jarring means further comprises a sector of the ground-contacting surface of the roller and wherein said jarring means ground-contacting surface is located at a shorter radial distance from the roller axis than the ground-contacting surface of the roller.

4. In a mobile spreader pulled by a tractor and controlled by an operator, having a rigid frame supported on at least one roller having a generally cylindrical ground-contacting surface having a hopper carried by said frame, said hopper having converging walls defining a cavity to receive material to be spread, and having a rectangular bottom outlet disposed in a generally horizontal plane and elongated in a direction generally transverse the direction of motion of the mobile spreader, the combination comprising:

(a) jarring means associated with the ground-contacting surface of the roller for rotation with it and including a jarring means ground-contacting surface located at a radial distance from the roller axis sufficiently different from that of the generally cylindrical surface of the roller as to impart a jolt to the hopper, as the jarring means ground-contacting surface contacts the ground, of sufficient force to prevent the formation of bridges of said material within the hopper when moist material is being spread;

(b) a rotatable impellor, said impellor comprising a first shaft extending through said hopper closely above and parallel to the elongated direction if said outlet, said impellor including a plurality of blades spaced from each other along the length of said first shaft, and extending radially outwardly from said first shaft, each of said blades being of such limited length as to avoid contact with any part of the hopper, said first shaft being connected to the roller for rotation by said roller;

(c) a rotatable agitator comprising a second shaft extending through the hopper parallel to the first shaft and spaced a substantial distance thereabove, said second shaft being connected to said first shaft for rotation with said first shaft in the same direction, said second shaft having a plurality of elements spaced from each other along the length of said second shaft and extending perpendicularly to said second shaft, said elements being thinner and longer than the blades on the first shaft, and of such length and spacing as, when the agitator is rotated, to sweep between pairs of radiating blades of the first shaft, thereby to break up any build-up of material which may occur in the hopper of bridging of said material about the area of the hopper swept by the blades of the rotatable impellor, said jarring means cooperating with said rotatable agitator to shake the material to be spread into the region swept by the elements of said rotatable agitator; and, (d) a spiker including a plurality of blades extending radially from a spiker axis and of such length that the tips of the blades terminate approximately on an imaginary cylindrical surface coaxial with the spiker axis, said spiker being mounted to the spreader rearward of the roller with said spiker axis substantially horizontal so that when the mobile spreader is drawn by the tractor the spiker will pass over a given area of turf after the material to be spread has been applied, aerating the turf and working the applied material into the turf during the same passage of the tractor in which the material is applied.

5. The combination of claim 4 wherein said spiker is mounted to the spreader with the spiker axis canted with respect to the axis of the roller.

6. In a mobile spreader pulled by a tractor and controlled by an operator, having a rigid frame supported on at least one roller having a generally cylindrical ground-contacting surface having a hopper carried by said frame, said hopper having converging walls defining a cavity to receive material to be spread, and having a rectangular bottom outlet disposed in a generally horizontal plane and elongated in a direction generally transverse the direction of motion of the mobile spreader, the combination comprising:

(a) jarring means associated with the ground-contacting surface of the roller for rotation with it and including a jarring means ground-contacting surface located at a radial distance from the roller axis sufficiently different from that of the generally cylindrical surface of the roller as to impart a jolt to the hopper, as the jarring means ground-contacting surface contacts the ground, of sufficient force to prevent the formation of bridges of said material within the hopper when moist material is being spread;

(b) a rotatable impellor, said impellor comprising a first shaft extending through said hopper closely above and parallel to the elongated direction of said outlet, said impellor including a plurality of blades spaced from each other along the length of said first shaft, and extending radially outwardly from said first shaft, each of said blades being of such limited length as to avoid contact with any part of the hopper, said first shaft being connected to the roller for rotation by said roller;

(c) a rotatable agitator comprising a second shaft extending through the hopper parallel to the first shaft and spaced a substantial distance thereabove, said second shaft being connected to said first shaft for rotation with said first shaft in the same direction, said second shaft having a plurality of elements spaced from each other along the length of said second shaft and extending perpendicularly to said second shaft, said elements being thinner and longer than the blades on the first shaft, and of such length and spacing as, when the agitator is rotated, to sweep between pairs of radiating blades of the first shaft, thereby to break up any build-up of material which may occur in the hopper or bridging of said material about the area of the hopper swept by the blades of the rotatable impellor, said jarring means cooperating with said rotatable agitator to shake the material to be spread into the region swept by the elements of said rotatable agitator;

(d) two pairs of rigid brace support elements, one pair extending rearwardly and downwardly from each side of the frame and spaced from each other pair of said elements, each pair of brace elements consisting of one preponderantly horizontal element having a forward end pivotally attached to the frame and its after end being orificed, and a second preponderantly vertical element, the last said element being slotted from a point near its upper end downwardly for a predetermined distance, and orificed at its lower end, said second element being slidably attached to said frame by bolt means extending through said slotting, and the orificed ends of each of said two elements being brought together to place their orifices in register; and (e) a ground processing element, said element extending between said two pairs of brace elements and having two opposite side edges, one of said edges being adapted to contact the ground surface to process the same, and a shaft member projecting from each end of said ground processing element coaxially with the other shaft to extend through the registering orifices in one said pair of rigid brace support elements, thereby to floatingly support said ground processing element behind the vehicle frame.

7. The combination of claim 6 wherein said ground processing element further comprises a spiker including a plurality of blades extending radially from a spiker axis and of such length that the tips of the blades terminate approximately on an imaginary cylindrical surface coaxial with the spiker axis, said spiker being mounted to the spreader in front of the roller with said spiker axis substantially horizontal so as to provide additional aeration of the turf when the mobile spreader is used for top dressing and so as to work the applied material deeper into the turf when the mobile spreader is used for overseeding so as to provide additional aeration of the turf when the mobile spreader is used for top dressing and so as to work the applied material deeper into the turf when the mobile spreader is used for overseeding.

8. The means as described in claim 6 wherein the ground processing element comprises a rake.

9. The means as described in claim 6 wherein the ground processing element comprises a floater plate.

10. The means as described in claim 6 wherein the axis of the shaft member projecting from each end of the ground processing element lies intermediate the two opposite side edges of said ground processing element, and a linkage of adjustable length is provided to extend between the slotted end of each preponderantly vertical rigid brace support element and the side edge of the ground processing element which is not adapted to contact ground surface.

11. The means as described in claim 10 wherein spring means are interposed between the adjustable linkage and the end of the rigid brace support element to which it is attached.

12. In a mobile spreader pulled by a tractor and controlled by an operator, having a rigid frame supported on at least one roller having a generally cylindrical ground-contacting surface having a hopper carried by said frame, said hopper having converging walls defining a cavity to receive material to be spread, and having a rectangular bottom outlet disposed in a generally horizontal plane and elongated in a direction generally transverse the direction of motion of the mobile spreader, the combination comprising:

(a) jarring means associated with the ground-contacting surface of the roller for rotation with it and including a jarring means ground-contacting surface located at a radial distance from the roller axis sufficiently different from that of the generally cylindrical surface of the roller as to impart a jolt to the hopper, as the jarring means ground-contacting surface contacts the ground, of sufficient force to prevent the formation of bridges of said material within the hopper when moist material is being spread;

(b) a rotatable impellor, said impellor comprising a first shaft extending through said hopper closely above and parallel to the elongated direction if said outlet, said impellor including a plurality of blades spaced from each other along the length of said first shaft, and extending radially outwardly from said first shaft, each of said blades being of such limited length as to avoid contact with any part of the hopper, said first shaft being connected to the roller for rotation by said roller; and, (c) a rotatable agitator comprising a second shaft extending through the hopper parallel to the first shaft and spaced a substantial distance thereabove, said second shaft being connected to said first shaft for rotation with said first shaft in the same direction, said second shaft having a plurality of elements spaced from each other along the length of said second shaft and extending perpendicularly to said second shaft, said elements being thinner and longer than the blades on the first shaft, and of such length and spacing as, when the agitator is rotated, to sweep between pairs of radiating blades of the first shaft, thereby to break up any build-up of material which may occur in the hopper or bridging of said material about the area of the hopper swept by the blades of the rotatable impellor, said jarring means cooperating with said rotatable agitator to shake the material to be spread into the region swept by the elements of said rotatable agitator;

(d) a spiker including a plurality of blades extending radially from a spiker axis and of such length that the tips of the blades terminate approximately on an imaginary cylindrical surface coaxial with the spiker axis, said spiker being mounted to the spreader rearward of the roller with said spiker axis substantially horizontal so that when the mobile spreader is drawn by the tractor the spiker will pass over a given area of turf after the material to be spread has been applied, aerating the turf and working the applied material into the turf during the same passage of the tractor in which the material is applied; and, (e) first means for selectively attaching the mobile spreader to the tractor in a forward orientation in which the roller passes over a given area of turf before the spiker passes over said given area so that after the material to be spread has been applied the material is worked into the turf and the turf is aerated by said spiker, and second means for selectively attaching the mobile spreader to the tractor in a backward orientation in which said spiker passes over a given area of turf before the roller passes over said given area so that the turf is spread and loosened by said spiker before the material to be spread is applied, whereby in the forward orientation the material applied is worked into the turf by the spiker at the rear and in the backward orientation the turf is opened up to receive the material to be spread before the material is applied, and the turf is rolled after the material has been applied.

13. The combination of claim 12 wherein said spiker is mounted to the spreader with the spiker axis canted with respect to the axis of the roller.

14. In a mobile spreader pulled by a tractor and controlled by an operator, having a rigid frame supported on at least one roller having a generally cylindrical ground-contacting surface having a hopper carried by said frame, said hopper having converging walls defining a cavity to receive material to be spread, and having a rectangular bottom outlet disposed in a generally horizontal plane and elongated in a direction generally transverse the direction of motion of the mobile spreader, the combination comprising:

(a) jarring means associated with the ground-contacting surface of the roller for rotation with it and including a jarring means ground-contacting surface located at a radial distance from the roller axis sufficiently different from that of the generally cylindrical surface of the roller as to impart a jolt to the hopper, as the jarring means ground-contacting surface contacts the ground, of sufficient force to prevent the formation of bridges of said material within the hopper when moist material is being spread;

(b) a rotatable impellor, said impellor comprising a first shaft extending through said hopper closely above and parallel to the elongated direction of said outlet, said impellor including a plurality of blades spaced from each other along the length of said first shaft, and extending radially outwardly from said first shaft, each of said blades being of such limited length as to avoid contact with any part of the hopper, said first shaft being connected to the roller for rotation by said roller;

(c) a rotatable agitator comprising a second shaft extending through the hopper parallel to the first shaft and spaced a substantial distance thereabove, said second shaft being connected to said first shaft for rotation with said first shaft in the same direction, said second shaft having a plurality of elements spaced from each other along the length of said second shaft and extending perpendicularly to said second shaft, said elements being thinner and longer than the blades on the first shaft, and of such length and spacing as, when the agitator is rotated, to sweep between pairs of radiating blades of the first shaft, thereby to break up any build-up of material which may occur in the hopper or bridging of said material about the area of the hopper swept by the blades of the rotatable impellor, said jarring means cooperating with said rotatable agitator to shake the material to be spread into the region swept by the elements of said rotatable agitator;

(d) a spiker including a plurality of blades extending radially from a spiker axis and of such length that the tips of the blades terminate approximately on an imaginary cylindrical surface coaxial with the spiker axis, said spiker being mounted to the spreader rearward of the roller with said spiker axis substantially horizontal so that when the mobile spreader is drawn by the tractor the spiker will pass over a given area of turf after the material to be spread has been applied, aerating the turf and working the applied material into the turf during the same passage of the tractor in which the material is applied; and, (e) first means for selectively attaching the mobile spreader to the tractor in a forward orientation in which the roller passes over a given area of turf before the spiker passes over said given area so that after the material to be spread has been applied the material is worked into the turf and the turf is aerated by said spiker, and second means for selectively attaching the mobile spreader to the tractor in a backward orientation in which said spiker passes over a given area of turf before the roller passes over said given area so that the turf is spread and loosened by said spiker before the material to be spread is applied, whereby in the forward orientation the material applied is worked into the turf by the spiker at the rear and in the backward orientation the turf is opened up to receive the material to be spread before the material is applied, and the turf is rolled after the material has been applied; and, (f) a second spiker including a plurality of blades extending radially from a spiker axis and of such length that the tips of the blades terminate approximately on an imaginary cylindrical surface coaxial with the spiker axis, said spiker being mounted to the spreader in front of the roller with said sapiker axis substantially horizontal so as to provide additional aeration and opening up of the turf when the mobile spreader is used in the forward orientation, and so as to work the applied material deeper into the turf when the mobile spreader is used in the backward orientation.

* * * * *